No. 611,470.  
W. F. GATEWOOD.  
CHURN.  
(Application filed Nov. 15, 1897.)  
Patented Sept. 27, 1898.

(No Model.)

ATTEST  
Nora Graham  
Ima Graham

INVENTOR,  
William F. Gatewood  
by L. P. Graham  
his attorney

UNITED STATES PATENT OFFICE.

WILLIAM F. GATEWOOD, OF DECATUR, ILLINOIS, ASSIGNOR OF ONE-HALF TO FINIS M. JOHNSON, OF SAME PLACE.

CHURN.

SPECIFICATION forming part of Letters Patent No. 611,470, dated September 27, 1898.

Application filed November 15, 1897. Serial No. 658,550. (No model.)

*To all whom it may concern:*

Be it known that I, WILLIAM F. GATEWOOD, of Decatur, in the county of Macon and State of Illinois, have invented certain new and useful Improvements in Mechanism for Separating Butter from Milk, of which the following is a specification.

This invention is intended to provide superior means for breaking the fat globules of milk and coalescing them. It is based on the theories and facts hereinafter stated. It is exemplified in the structure hereinafter described, and it is defined in the appended claims.

In separating butter from the milk in which it is contained it is necessary to first rupture the fat cells or globules and then coalesce the contents of the cells into a mass of butter. The cells are very small. They require either long-continued agitation or sharp quick strokes to produce rupture, and rupture and subsequent coalescence are best performed when air is freely supplied. In this instance the globules of fat are broken by quick sharp strokes rapidly repeated, the contents of the globules are coalesced by centrifugal pressure against a revolving surface, and air is supplied through a central aperture in the milk, which aperture is formed by centrifugal action.

The mechanism employed consists of a prismatic milk-receptacle, in which is placed a hollow cylinder having a perforated bottom and no top. The cylinder is telescopic or longitudinally extensible in order that its upper end may be brought about on a level with the milk or cream in the receptacle, and it has a central shaft by means of which it is rotated. The perforations in the bottom of the cylinder are disposed in two sets, one of which constitutes the globule-rupturing mechanism and comprises a circle of preferably circular apertures arranged concentric with the cylinder near the perimeter thereof and the other of which constitutes air-passages and comprises a number of openings near the center of the cylinder. The stand for the receptacle and the mechanism for rotating the cylinder have peculiarities of construction, as will hereinafter appear.

Figure 1:
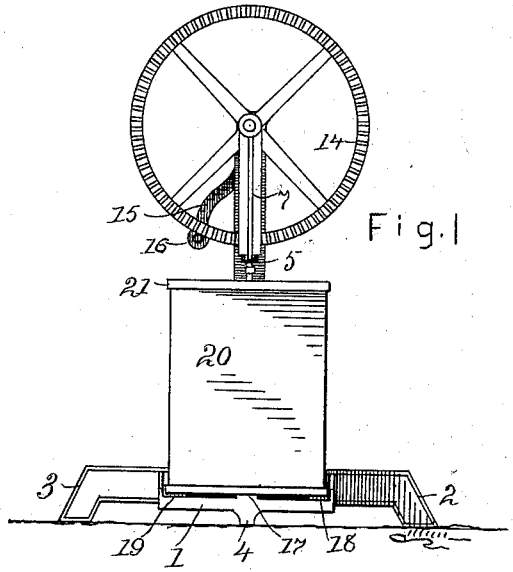
Figure 2:
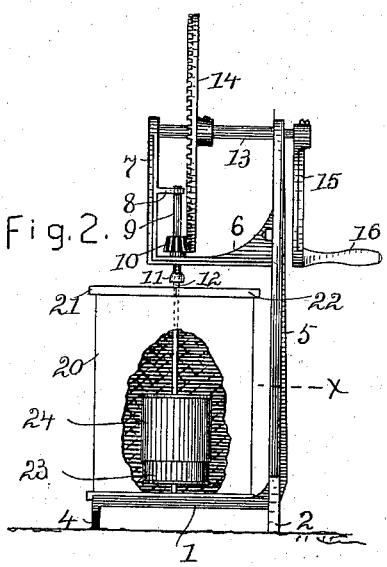
Figure 3:
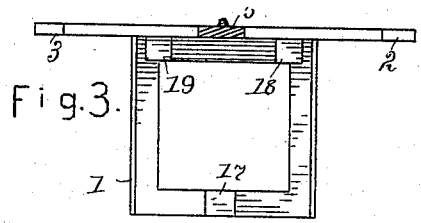
Figure 4:
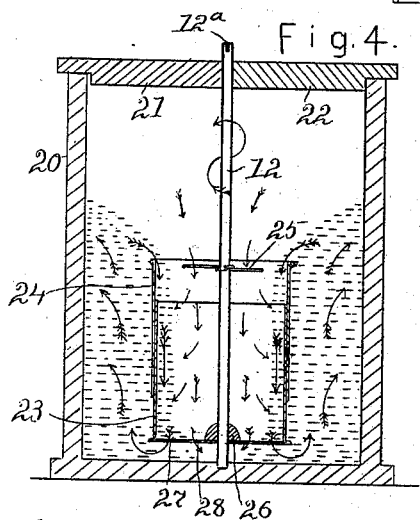
Figure 5:
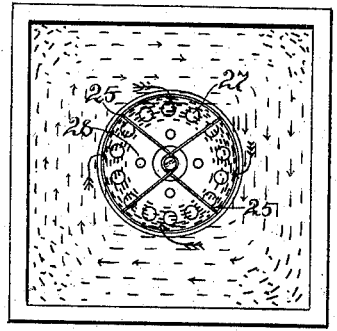
Figure 6:
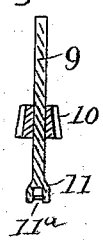

In the drawings forming part of this specification, Figure 1 is a front elevation of separating mechanism constructed in accordance with my invention. Fig. 2 is a side elevation of the same with a side of the receptacle broken away to expose the cylinder. Fig. 3 is a plan of the base of the stand on line $x$ in Fig. 2. Fig. 4 is a vertical section through the receptacle and the cylinder illustrative of separating operation. Fig. 5 is a plan of the receptacle and the cylinder, further illustrating the operation of the cylinder. Fig. 6 is a sectional detail of a part of the cylinder-driving mechanism.

The stand for the receptacle consists of a platform 1, having side ledges, feet 2, 3, and 4, forming a tripod, and an upright 5, on which the cylinder-driving mechanism is supported. A bracket 6 is fastened to the upper portion of upright 5, and it has an upward extension 7. A horizontal shaft 13 is journaled in the upper ends of upright 5 and extension 7. It carries a gear-wheel 14 between its bearings, and it has on one end a crank-arm 15, to which handle 16 is fixed. A vertical shaft 9 has bearings in bracket 6 and in a projection 8. It has a pinion 10, that meshes with wheel 14, and it also has a clutch-head 11 on its lower end. The clutch-head has a cross-bar 11ª, as shown in Fig. 6, which is adapted to engage a recess 12ª in the shaft 12 of the cylinder, and the shaft 9 has sufficient motion lengthwise in its bearings to permit the clutch-head to be moved out of engagement with the cylinder-shaft. The milk or cream receptacle 20 is in this instance square in cross-section. It rests on the triangularly-disposed bosses 17, 18, and 19 on platform 1, and it has a two-part cover 21 and 22. The cylinder-shaft 12 extends through an opening in the cover and has a step-bearing in the bottom of the receptacle. The bottom of the cylinder is fastened to a boss 26, which is fixed on the lower end of shaft 12, and it has an outer set of openings 27 and an inner set 28. The cylinder is composed of two parts 23 and 24, one of which telescopes on the other, and brace-rods 25 extend from the upper end of the upper part and embrace the shaft 12. The bottom of the cylinder is raised some little distance above the bottom of the receptacle, so as to provide passage for milk and air, and there is considerable space between the perimeter of the cylinder and the sides of the receptacle.

In operating the device milk or cream is placed in the receptacle, the cylinder is lengthened or shortened until its upper end is about on a level with the milk, and motion is imparted to the shaft by the mechanism shown and described or by any means, and centrifugal action is developed, which draws the milk downward through openings 27, forming a central vacancy and an outward accumulation. The circular motion of the cylinder imparts a like motion to the milk, and the normal tendency is for the milk to revolve around the cylinder against the sides of the receptacle. This tendency is broken, however, by the abrupt turns in the wall of the receptacle, and reactions are set up in the corners which cause the milk to splash over the top of the cylinder at about the relative locations indicated by the longer arrows in Fig. 5. As soon as the milk is inside the cylinder it is forced against the wall thereof by centrifugal force and gradually descends in a thin sheet to the openings 27, where it is again subjected to sharp concussion, and so the operation continues until butter is formed.

The globules of fat are ruptured by the action of the sides of the openings 27 in the bottom of the cylinder, the released fat is coalesced by centrifugal pressure against the wall of the cylinder and rolling action resulting from the cylinder's rotation, and air is fed freely downward into the cylinder against the thinned wall of milk and through openings 28 into the body of the milk outside the cylinder.

The tripod formation of the stand insures a steady support, as do also the triangularly-disposed bosses on which the receptacle rests. The two-part cover gives easy access to the milk, and the longitudinally-movable shaft 9 and the clutch-head thereon provide means for readily connecting and disconnecting the cylinder-shaft with the driving mechanism.

While it is preferable to make the receptacle square, it is obvious that almost any prismatic form will tend to divert the milk from its circular path and force it over the wall of the cylinder, or obstructions may be placed in a circular receptacle to make it in effect internally prismatic.

What I claim is—

1. Mechanism for rupturing the fat globules of milk and coalescing the fat, comprising a prismatic receptacle, a vertical, rotatable shaft in the receptacle, and a hollow cylinder with perforated bottom and no top fixed on the shaft above the bottom of the receptacle whereby the milk is made to pass downward through the perforations, upward outside the cylinder and over the top of the cylinder, substantially as described.

2. Mechanism for rupturing the fat globules of milk and coalescing the fat, comprising a prismatic receptacle, a vertical rotatable shaft in the receptacle, and a hollow telescoping cylinder with perforated bottom and no top fixed on the shaft above the bottom of the receptacle, substantially as described.

3. Mechanism for rupturing the fat globules of milk and coalescing the fat, comprising a prismatic receptacle, a vertical rotatable shaft in the receptacle and a hollow cylinder with a bottom but no top fixed on the shaft above the bottom of the receptacle, the bottom of the cylinder having a set of perforations near its perimeter and also having another set of perforations nearer its center, substantially as described.

4. In mechanism for rupturing the fat globules of milk and coalescing the fat, the combination of the tripod-formed frame, having the triangularly-disposed seat-bosses, the prismatic receptacle seated on the bosses, the gear-wheel journaled in the frame above the receptacle, the longitudinally-shiftable vertical shaft having a pinion and a clutch-head, the vertical shaft in the receptacle adapted to engage the clutch-head and a hollow cylinder having a perforated bottom and no top fixed on the vertical shaft above the bottom of the receptacle.

In testimony whereof I sign my name in the presence of two subscribing witnesses.

WILLIAM F. GATEWOOD.

Attest:
F. M. JOHNSON,
LEVI P. GRAHAM.